March 20, 1945.　　　J. DICHTER　　　2,371,881
APPARATUS FOR SHAPING ELLIPTICAL GLASS TUBES
Filed March 6, 1941　　　2 Sheets-Sheet 1
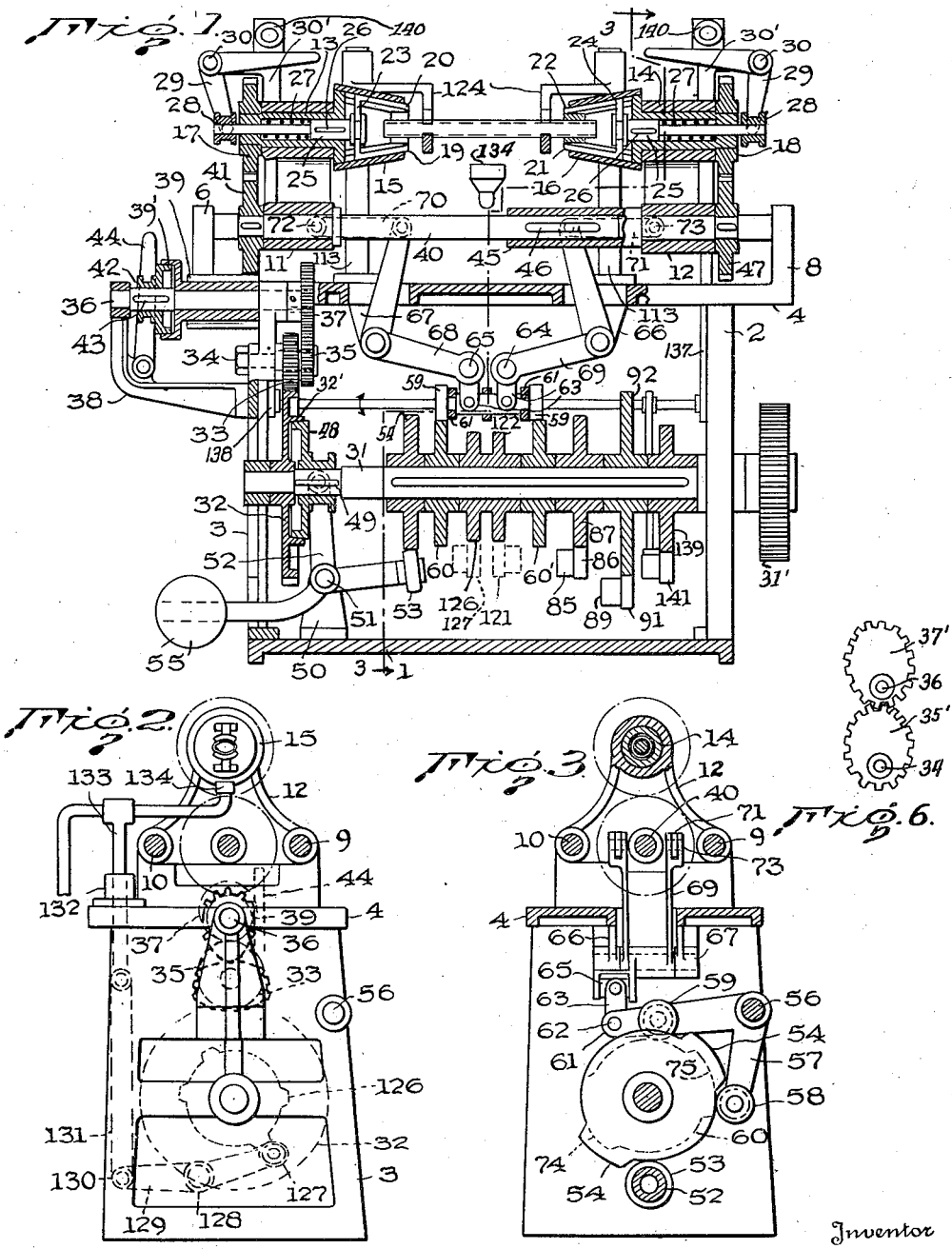
Inventor
Jakob Dichter,
By Charles B. Belknap
Attorney Inventor
Jakob Dichter,
By Charles B. Belknap
Attorney Patented Mar. 20, 1945

2,371,881

UNITED STATES PATENT OFFICE 2,371,881

APPARATUS FOR SHAPING ELLIPTICAL GLASS TUBES

Jakob Dichter, Berlin-Schoneberg, Germany; vested in the Alien Property Custodian Application March 6, 1941, Serial No. 382,081 In Germany January 11, 1940

5 Claims. (Cl. 49—7)

The present invention relates to a machine for shaping glass tubes, rods, or similar glass blanks, and more particularly to a machine for heating and shaping articles having a non-circular cross-section.

While apparatus for heating and shaping articles having a circular cross-section have been in use for some years, it has been found that certain difficulties arise when this type of machine is employed to heat and shape articles other than cylindrical objects. If, for instance, a tube of elliptical cross-section be subjected to the heat from a relatively fixed burner and is rotated at constant speed, certain peripheral portions of the walls of the elliptical tube will be heated to a greater degree than other portions of the tube.

It is one of the objects of this invention to provide means for uniformly heating and shaping glass rods or tubes having a non-circular cross-section.

It is another object of the invention to provide a novel arrangement of cooperating mechanisms designed to feed and grip the glass blanks while they pass through the operations of heating and shaping.

Other objects will be apparent from the following description of the invention taken in connection with the accompanying drawings, in which Fig. 1 is a sectional elevation of the machine taken on line 1—1 of Fig. 4;

Fig. 2 is a partial side elevation, partly in section;

Fig. 3 is a partial section taken on line 3—3 of Fig. 1;

Fig. 6 illustrates a modified form of variable gearing employed in the machine.

Figure 4:
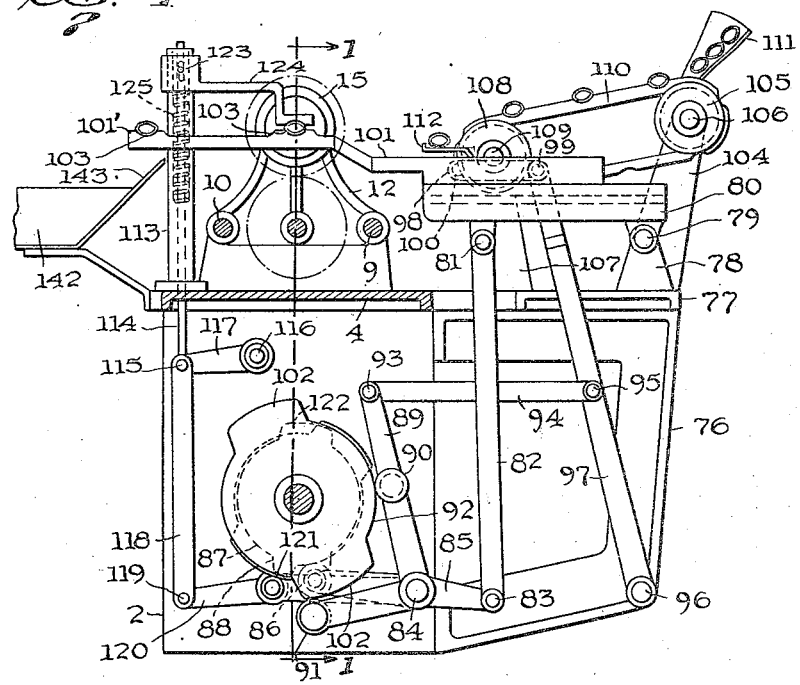
Fig. 4 is a side elevation of the machine showing the feeding and gripping means.

In the drawings, it will be seen that the base 1, side frames 2 and 3, and table 4 constitute a box-like structure designed to support the various parts of the machine. Standards 5, 6, 7 and 8 support fixed rods 9, 10 on which brackets 11, 12 are slidably mounted. Journaled in brackets 11, 12 are hollow shafts 13, 14 on the ends of which are supported chucks 15, 16. Also secured to shafts 13, 14 are the gears 17, 18. The chucks include gripping fingers 19, 20, 21, 22, the latter converging toward their inner ends and cooperating with inclined faces on the chucks to close or open the fingers. Lugs 23, 24 on the fingers engage grooves in shafts 25 keyed at 26 to shafts 13, 14. Normally the fingers are urged into closed position by springs 27 surrounding shafts 25 and bearing against shoulders on the shafts 13, 14 and 25, respectively. Fixed to each shaft is a grooved collar 28 adapted to be engaged by bell-crank lever 29, the latter being pivoted at 30 on the uprights 30'. It is apparent that, by rocking lever 29, the shafts 25 and the gripper fingers may be moved outwardly to open the chucks.

Suitably journaled in the side frames 2 and 3 is a shaft 31 having a main drive gear 31' adapted to be driven by any prime mover. Keyed to shaft 31 are a plurality of cams, the purpose and operation of which will be explained hereinafter. Gear 32, loose on shaft 31, meshes with gear 33 secured to shaft 34 to which latter shaft is fastened an elliptical gear 35. Keyed on shaft 36 is a second elliptical gear 37 which meshes with gear 35. Shaft 36 is suitably journaled in a side bracket 38. A relatively long gear 39 is loose on shaft 36 and is provided at one end with a clutch portion 39' adapted to engage a clutch cone 42 slidably keyed at 43 to shaft 36. Lever 44 pivoted on bracket 38 cooperates with cone 42 to move the latter into engagement with the portion 39' when it is desired to rotate gear 39 with shaft 36.

Keyed to shaft 40 and movable axially therewith is a gear 41 which meshes with gear 39. Shaft 40 is journaled at one end for axial as well as rotational movement in bearing 6 and at its other end is telescoped into and keyed at 46 to a hollow shaft 45 so that shafts 40 and 45 are axially movable with respect to each other but rotate together. Gear 47 keyed to shaft 45 moves axially therewith and meshes with gear 18 associated with chuck 16. It is to be noted that gear 32 is provided with a coupling portion 32' engageable with an axially movable clutch cone 48 keyed on shaft 31 at 49. Clutch 32'—48 is intermittently coupled and uncoupled by bell-crank 52, the latter being oscillated by cam 54 engaging follower 53. This provides for intermittent rotation of gears 32, 33, 35 and 37. Hence, rotation of the grippers 15 and 16 is intermittent. Clutch 39'—42 may be uncoupled at any time by the machine operator to permit adjustment of the timing of the grippers. When the grippers are so positioned that the glass blank and heating burner are in the proper relation, the clutch is coupled and no further adjustment is necessary.

Journaled in bracket 50 on pin 51 is a three-arm lever 52 having on one of its arms a cam follower 53 engageable with cam 54. Another arm of the lever carries counterweight 55 for urging the follower against the cam. The third arm of the lever cooperates with cone 48 to move the latter into and out of engagement with the coupling portion 32' of gear 32. The cam 54 is so designed that only at predetermined intervals are the several shafts and associated parts referred to hereinbefore rotated by the constantly rotating shaft 31.

As explained herein, the brackets 11 and 12 are slidable axially of the rods 9 and 10 and carry with them in their axial movement the chucks and gears for rotating the latter. The means for reciprocating brackets 11 and 12 comprises a pair of bell-crank levers 57 keyed to shaft 56 (Fig. 3) and having at the ends of their arms cam followers 58, 59, the latter engaging cams 60, 60' on shaft 31. Also fixed to shaft 56 is an arm 61 having a pin 62 thereon which is connected by links 63 pivoted at 64, 65 to bell-crank levers 68, 69, the latter being fulcrumed on brackets 66, 67 depending from table 4. The upper ends of levers 68, 69 are connected respectively to brackets 11, 12, by connecting links 70, 71 pinned to the bracket at 72, 73. The risers 74, 75 on cams 60, 60' are so designed that the chucks are moved toward and away from the center of the machine in timed relation to other parts of the machine as will be further explained herein.

At the forward end of the machine a subframe 76 supports a bearing plate 77 having an upright bracket 78 thereon. Pivoted at 79 to bracket 78 is a rockable slide bearing 80 to which is pivotally connected at 81 a connecting link 82. This link is pivoted at 83 to one end of lever 85 fulcrumed on shaft 84. The other end of lever 85 carries follower 86 which engages cam 87 having risers 88 thereon. This arrangement provides for vertical oscillation of the bearing 80. Bell crank lever 89 is also fulcrumed on shaft 84 and carries followers 90, 91 which ride on cam 92. Lever 89 is connected at 93 to one end of link 94, the other end of which is connected at 95 to rocker 97, the latter being pivoted at 96 to sub-frame 76. Slidably supported in bearing 80 for horizontal reciprocation thereon is a feeder arm 101. The feeder arm is connected to rocker 97 by a link 98 pivoted to the rocker at 99 and to the feeder arm at 100. Risers 102 on cam 92 effect oscillation of rocker 97 and, consequently, reciprocation of the feeder arm. It will thus be apparent that the feeder is oscillated vertically and reciprocated horizontally. The feeder arm is provided with a forked extension 101' having saddles 103 shaped to support the non-circular blanks in such a position that they are readily gripped by the chucks and bear a predetermined relation to the means for rotating the chucks.

Mounted on plate 77 are brackets 104 supporting a pair of pulleys 105 on shaft 106, the latter being driven from shaft 31 by suitable means (not shown). Brackets 107 support a second pair of pulleys 108 on shaft 109. These pulleys are grooved to accommodate flexible notched belts 110, the belts being driven by pulleys 105. A magazine 111 containing a supply of blanks is so positioned above the belts that the notches therein engage the blanks and carry them to a pair of shelves 112 secured to brackets 107, from which they are removed by the feeder arm during the vertical and longitudinal movement of the latter. The longitudinal movement of the feeder arm equals the distance between notches 103 and the vertical movement of the arm is such that the notches in the arm engage the blanks during the upward movement of the arm to remove the blanks one at a time from shelves 112.

Figure 5:
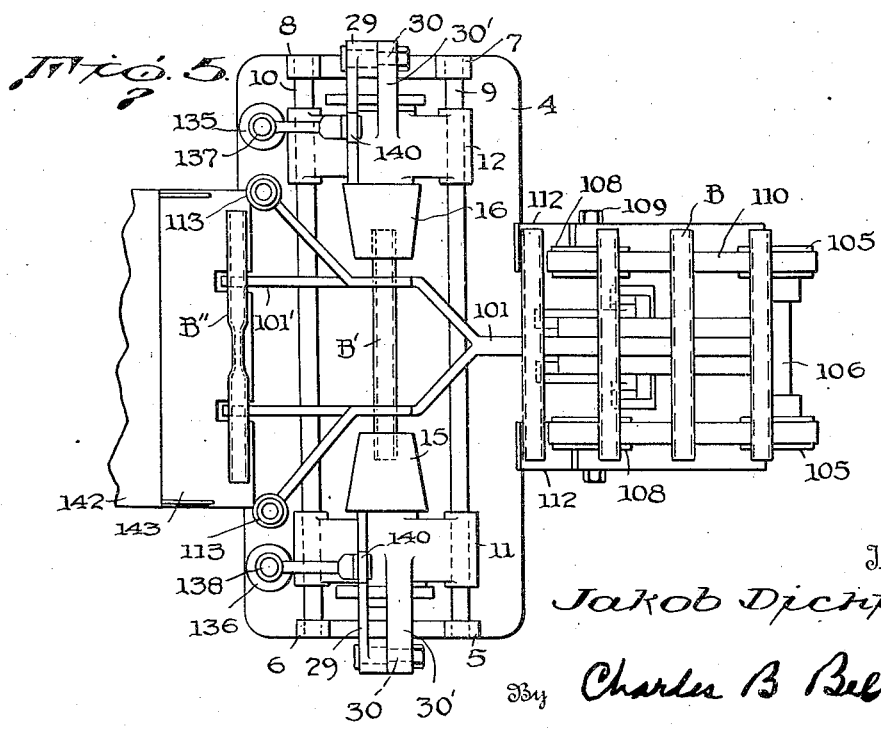
Fig. 5 is a top plan view of the machine.

As will be seen in Figs. 4 and 5, a pair of vertical guides 113 are supported by table 4. These guides are hollow and accommodate rods 114 connected at their lower ends at 115 to rockers 117 pivoted at 116 and to the upper ends of links 118. Arm 120 is pivotally fastened to a rod 119 connecting the lower ends of links 118, this arm being fulcrumed on shaft 84 and carrying a follower 121 engageable with cam 122. The latter cam is designed to lower rod 114 in timed relation to the feeder arm mechanism previously described. Secured to rods 114 by means of pins or set screws 123 are a pair of arms 124 having suitably shaped recesses on their lower faces to engage the glass blanks and, in conjunction with the similarly shaped saddles in the feeder arm extensions, properly position the blanks so that they will lie in a predetermined relation to the gripper mechanism of the chucks as the chucks move toward them to grip the blanks. The arms 124 are elevated by springs 125 within the guides 113 when the risers on cam 122 pass the follower 121.

It is desirable that the position of the burners with respect to non-circular blanks be varied during the heating operation, that is, the burners should be maintained a fixed distance from the periphery of the portion of the blank being heated. In order to raise and lower the burners in timed relation to the rotation of the blanks, the mechanism shown in Fig. 2 is employed. It will be seen from the drawings that cam 126 having a plurality of risers thereon engages follower 127 on lever 129 fulcrumed at 128, the lever being connected at 130 to link 131. Guide 132 on table 4 accommodates a vertically slidable rod 133 also connected to link 131 and supporting burner 134. Suitable valve means and a pilot are provided for operation of the burner only when it is in heating relation to the blank. It is evident that the burner is reciprocated vertically and in such timed relation to the chucks that the distance between the burner and the non-circular wall of the blank remains constant and a uniform heating of the wall results therefrom.

The means for opening the chucks is shown in Figs. 1 and 5 from which it will be seen that guides 135, 136 accommodate vertically slidable rods 137, 138 having rollers 140 thereon. Cam 139 cooperates with follower 141 which is connected by suitable mechanism with rods 137, 138 to raise and lower the rods. Rollers 140 engage the levers 29 as they are lowered to open the chucks.

In Fig. 5 there are shown several blanks at various stages of the heating and shaping thereof. The blanks B are shown on the feeding mechanism, blank B' is positioned in the chucks during the heating operation, and blank B" is a shaped blank, a portion thereof being constricted by stretching the heated blank. This may be done while the blanks are gripped by the chucks and the latter moved away from each other. The finished blanks are deposited in a suitable container 142 at the discharge end of the machine, the blanks being removed from the feeder arm by a projecting inclined plate 143 on the container when the feeder arm is lowered.

From the foregoing description of the machine the operation thereof will be apparent. The blanks B are taken from the magazine at timed intervals by the notched belt which deposits them on the shelves 112. The feed arm moves in a path which is substantially rectangular so that it picks up a blank and positions it in alignment with the chucks. The feed arm then remains stationary while the chucks move toward the blank and grip it. As the feed arm is lowered, the chucks rotate the blank which is now in position to be heated by the burner. Because of the elliptical gearing employed the angular velocity of the rotating blanks varies constantly but the linear velocity of that portion of the periphery of the blank immediately over the burner always remains the same and in a plane passing through the center of the blank and the burner. Also, the burner is moved vertically to maintain a distance between it and that portion of the blank lying in a plane passing through the center of the blank and the burner which remains constant. Hence uniform heating of the blank is obtained. The various cams are so designed that the several operations are carried out in timed sequence, that is, the blanks are fed to the chucks which are moved in to grip the blanks and then rotate them, after which they are constricted. The finished blanks are then picked up by the notched free end of the feed arm and deposited in the discharge container.

In Fig. 6 is shown a modified arrangement of the elliptical gears, the gears 35' and 37' being eccentrically mounted on the shafts 34 and 36 respectively.

While in the example illustrated the blank is shown as being elliptical in cross-section, it is obvious that other shapes may be fabricated merely by substituting suitable gearing and cams. The invention is, therefore, not limited to the exact arrangement shown and described.

Having described my invention, what I claim as new and desire to secure by Letters Patent is:

1. Apparatus for heating and shaping a glass blank having a substantially elliptical cross section, comprising means for gripping the blank, means for heating the blank, and elliptical gearing for rotating said gripping means at a constantly varying angular velocity.

2. Apparatus for heating and shaping a glass blank having a substantially elliptical cross section, comprising means for gripping the blank, means for heating the blank, and change speed means for rotating said gripping means at a constantly varying angular velocity, said change speed means including gearing having a constantly varying ratio.

3. Apparatus for heating and shaping a glass blank having a substantially elliptical cross section, comprising means for gripping the blank, means for heating the blank, means for rotating said gripping means, and means operated in timed relation to said last mentioned means for constantly varying the position of the burner with respect to the longitudinal center of the blank to maintain a constant distance between the heating means and that portion of the periphery of the blank nearest the heating means.

4. Apparatus for heating and shaping a glass blank having a substantially elliptical cross section, comprising means for gripping the blank, a burner for heating the blank, means including gearing having a constantly varying ratio for rotating and constantly varying the angular velocity of said gripping means, and means operated in timed relation to said last mentioned means for reciprocating said burner at a varying speed to constantly change the position of the burner with respect to the longitudinal center of the blank so as to maintain a constant distance between the burner and that portion of the periphery of the blank nearest the burner.

5. Apparatus for heating and shaping a glass blank having a substantially elliptical cross section, comprising means for gripping the blank, means for heating the blank, change speed means for rotating said gripping means at a constantly varying angular velocity, said change speed means including gearing having a constantly varying ratio, and cam mechanism operated in timed relation to said gripping means for reciprocating said heating means, said mechanism positioning the heating means in constantly fixed spaced relation to that portion of the periphery of the blank nearest the heating means.

JAKOB DICHTER.